(12) United States Patent
Markusch et al.

(10) Patent No.: US 6,786,680 B2
(45) Date of Patent: Sep. 7, 2004

(54) PROCESS FOR PATCHING CANALS AND DITCHES WITH A NON-SAGGING POLYURETHANE COMPOSITION

(75) Inventors: Peter H. Markusch, McMurray, PA (US); Ralf Guether, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 405 days.

(21) Appl. No.: 09/809,453

(22) Filed: Mar. 15, 2001

(65) Prior Publication Data

US 2002/0177652 A1 Nov. 28, 2002

(51) Int. Cl.⁷ .......................... B05D 3/02; B32B 27/00; B32B 27/40; E02D 17/20; C09K 17/00
(52) U.S. Cl. .................... 405/270; 405/264; 405/302.7; 427/136; 427/372.2; 427/385.5; 428/423.1; 524/590; 528/44; 528/61; 528/65; 528/85
(58) Field of Search .......................... 524/590; 528/44, 528/61, 65, 85; 427/585.5, 372.2, 136; 428/423.1; 405/270, 268, 302.7, 264

(56) References Cited

U.S. PATENT DOCUMENTS

| | | | |
|---|---|---|---|
| 4,872,784 A | 10/1989 | Payne | 405/270 |
| 4,955,759 A | 9/1990 | Payne | 405/270 |
| 4,955,760 A | 9/1990 | Payne | 405/270 |
| 5,011,903 A | 4/1991 | Lymburner et al. | |
| 5,049,006 A | 9/1991 | Payne | 405/270 |
| 5,062,740 A | 11/1991 | Payne | 405/270 |
| 5,421,677 A | 6/1995 | Adam et al. | 405/270 |
| 5,607,998 A | 3/1997 | Markusch et al. | 524/494 |
| 5,639,331 A | 6/1997 | Payne | 156/242 |

FOREIGN PATENT DOCUMENTS

EP        0 440 934        8/1991

OTHER PUBLICATIONS

Database WPI Section Ch, Week 199848 Derwent Publications Ltd., London, GB; Class A25, AN 1998–563219 XP002206187 & JP 10 251370 A (Sun Techno Chem KK), Sep. 22, 1998 abstract.

*Primary Examiner*—Patrick D. Niland
(74) *Attorney, Agent, or Firm*—Joseph C. Gil; John E. Mrozinski, Jr.

(57) ABSTRACT

Seams are sealed and surface defects are repaired in a polyurethane/geotextile composite applied over concrete, an earthen canal or a ditch with a non-sagging polyurethane composition. This non-sagging polyurethane composition is a reaction product of a polyisocyanate, a high molecular weight polyhydroxyl compound, and a compound containing at least two amino groups. A low molecular weight diol or triol, a catalyst and a filler are optionally included in the polyurethane-forming reaction mixture.

47 Claims, No Drawings

PROCESS FOR PATCHING CANALS AND DITCHES WITH A NON-SAGGING POLYURETHANE COMPOSITION

TECHNICAL FIELD OF THE INVENTION

The present invention relates to a process for sealing a seam of a polyurethane/geotextile composite applied over concrete or earthen canals and/or ditches with a non-sagging polyurethane composition. The present invention also relates to a process for patching a polyurethane/geotextile composite with a non-sagging polyurethane composition. The present invention further relates to a process for repairing concrete canals and/or ditches with a non-sagging polyurethane composition. The present invention also relates to a ditch and/or canal lined with a polyurethane/geotextile composite wherein the integrity of the canal and/or ditch has been maintained with a non-sagging polyurethane composition.

BACKGROUND OF THE INVENTION

In recent years, the management of natural resources has become important in many countries throughout the world. Efforts have been directed both toward the conservation of our resources and toward the elimination of pollution from our environment. Particular emphasis has been placed on waste leakage and water loss.

Losses in the distribution of water using unlined irrigation ditches are estimated at a minimum to be 25% and in some situations to be more than 50% depending upon the porosity of the ditch surface and the distance the water is being moved. In most rural areas, ditches are formed by excavating the soil to the desired depth and width. The water moves through the ditch in contact with the exposed natural surface. This can be sand, clay, rocks, etc. and, more commonly, mixtures thereof. The porosity will depend upon the proportions of the different components.

The loss of water in unlined irrigation ditches was at one time considered acceptable only because the supply of water exceeded demand. However, as civilization has developed and world population increased, more water is required for both greater food production and for markedly increasing non-agriculture uses. In addition to greater domestic uses in sanitation, industry now employs large quantities of water in manufacturing and processing procedures.

This high level of consumption plus the very high cost of developing new water supplies has shifted attention to water conservation. Domestic appliances that use less water have been developed. Also, industry has installed recycling purification systems to reduce water consumption.

Although conservation efforts have reduced water consumption to a degree, water is still in relatively short supply, particularly in recent years with the severe droughts in the United States and other countries. Since the most cost effective conservation opportunities and readily accessible water supplies already have been developed, greater attention must be directed to improving the efficiency of water distribution systems.

Improvements in water distribution have been made. A limited number of ditches and canals have been lined with concrete and/or preformed concrete pipes. Concrete is durable and has a long life when properly used. However, concrete is expensive to place and finish and is damaged by unfavorable temperatures during curing. Also, concrete is subject to frost damage, cracking and heaving which results in leaks.

Processes for forming composite liners for canals and ditches and apparatus to perform such a processes are disclosed, for example, in U.S. Pat. Nos. 4,872,784; 4,955,759; 4,955,760; 5,049,006; 5,062,740; 5,421,677; 5,607,998; and 5,639,331.

U.S. Pat. No. 5,421,677 ("the '677 patent") is directed to an improved process of forming a ditch liner. The process of the '677 patent discloses the use of a mixture comprising one or more polyisocyanates, a polyol mixture, one or more fillers, and a catalyst. The mixture of the '677 patent is dispensed on a geotextile, thereby forming a liquid polyurethane soaked geotextile composite. The liquid polyurethane soaked geotextile composite is then placed over the surface of an area to be lined and allowed to cure, thereby forming a polyurethane/geotextile composite. The polyurethane/geotextile composite must be cut to be placed over obstructions in the area to be lined. In a canal, for example, obstructions such as valves and gates are present. When the polyurethane/geotextile composite is cut around these obstructions, a seam is generated between the surface of the area being lined and the polyurethane/geotextile composite. This seam must be sealed in order to obtain a watertight connection between the area being lined and the polyurethane/geotextile composite.

A non-sagging polyurethane composition is specifically well suited to be used as a seam sealant because it can be applied to seams as a bead, which subsequently can be spread over the seam using, for example, a spatula. A non-sagging polyurethane composition would exhibit excellent adhesion to the concrete of the ditch and/or canal as well as to the polyurethane/geotextile composite and, after curing, provide a watertight seal. The same non-sagging composition could be used to fill tears, rips and/or other abrasions in the polyurethane/geotextile composite. Additionally, the same non-sagging composition could be used to fill holes and cracks in the concrete or to consolidate loose pieces of concrete prior to the application of the polyurethane/geotextile composite.

Various non-sagging polyurethane compositions are known in the art and described in, for example, in U.S. Pat. Nos. 4,444,976; 4,552,934; 4,698,408; 4,728,710; 4,743,672; 4,954,199; 4,994,540; 5,059,672; 5,164,473; and 5,166,303.

These patents disclose two-component polyurethanes basically consisting of a polyisocyanate or polyisocyanate prepolymer component, and a curative component containing a polyol and a polyamine.

U.S. Pat. No. 4,444,976 ("the '976 patent") discloses sag-resistant adhesive two component compositions. These compositions require an isocyanate prepolymer, a low molecular weight polyol containing at least 2–5 hydroxyl groups and a secondary diamine having a molecular weight of up to about 325. The adhesive claimed in the '976 patent exhibits a gel time at 24° C. of at least two minutes. The relatively short gel time of the adhesive claimed in the '976 patent makes it unsuitable for outdoor applications where gel times of more than 10 minutes are usually required.

U.S. Pat. No. 5,607,998 ("the '998 patent") also discloses non-sagging polyurethane compositions. These compositions require a liquid polyisocyanate, a liquid isocyanate-reactive mixture, one or more hydroxyl group containing compounds, one or more diamines, polyamines, amine terminated polyethers and mixtures thereof, with at least one of the organic compounds containing at least one aromatic amine group, and one or more low molecular weight diols or triols, and an inorganic filler mixture composed of glass flakes and talc. The addition of talc to glass flakes containing liquid polyurethane raw materials provides homogeneous, phase stable systems. The reaction mixture as described in the '998 patent forms a non-sagging polyurethane composition, which is sandable once it is fully cured. The use of two fillers, one being an extremely abrasive glass filler, is a disadvantage in applications where sandability is unnecessary.

Whenever a ditchliner is installed according to the '677 patent, the geotextile sheets soaked with the liquid solidifiable polyurethane are applied in such a fashion that the sheets overlap to a certain extent in order to obtain a seamless liner after the resin has cured. Due to the unevenness in dirt and broken concrete ditches, wrinkles are often formed at the seam of the overlapping portion resulting in openings and potential leakage. This is a problem that has to be addressed to provide a functioning liner for canals and ditches.

In the case of large wrinkles in the polyurethane geotextile composite, insufficient adhesion to the surface is obtained and water may seep behind the liner, and possibly result in separation of the liner from the substrate. In those cases the wrinkles are preferably cut open. The liner then has to be adjusted to the surface and the newly generated seam has to be sealed.

Canals and ditches have slidegate turnouts to direct the waterflow into other ditches or to irrigate fields by flooding. The polyurethane geotextile composite liner has to be cut around these outlets and the seams between the ditch surface and the liner have to be sealed to avoid water penetration behind the liner. To solve the above-mentioned problems a seam sealant has to be applied.

In canals and ditches that are already lined, damage can occur to the liner in the form of rips, tears, and/or other abrasions to the liner, which have to be repaired for the liner to be fully functional again.

In concrete canals and ditches where leakage is occurs through cracked and broken concrete, it is often desirable to patch, consolidate, and repair cracked and broken concrete as such, or prior to the application of a new liner.

For the foregoing reasons, it would be desirable to develop a non-sagging polyurethane composition, which can be used as a seam sealant for a polyurethane/geotextile composite. It would also be desirable to use the same composition as a non-sagging polyurethane composition to repair rips, tears and/or other abrasions on a polyurethane/geotextile composite. Finally, it would also be desirable to use such a non-sagging polyurethane composition for repairing broken and/or loose concrete in canals and/or ditches.

SUMMARY OF THE INVENTION

It is an object of the present invention to provide a process for sealing a seam of a polyurethane/geotextile composite installed in a ditch and/or canal.

It is another object of the present invention to provide a process for patching a polyurethane/geotextile composite installed in a canal and/or ditch.

It is a further object of the present invention to provide a process for repairing loose and/or damaged concrete in a canal and/or ditch.

It is also an object of the present invention to provide a ditch and/or canal lined with a polyurethane/geotextile composite wherein the integrity of the canal and/or ditch has been maintained with a non-sagging polyurethane composition.

These and other objects, which will be apparent to those skilled in the art, are accomplished by dispensing a non-sagging polyurethane composition onto an area to be sealed, repaired, and/or patched, the non-sagging polyurethane composition being a reaction product of: a) a liquid polyisocyanate component; b) about 80–98% by weight, based on the total weight of b) and c), of a liquid isocyanate reactive component comprising one or more hydroxyl group containing compounds having from about 2 to about 6 hydroxyl groups and a number average molecular weight of from at least 250 to about 8,000, and, optionally, one or more low molecular weight diols or triols having hydroxy equivalent weights of from about 31 to 99; c) from about 2–20% by weight, based on the total weight of b) and c), of an isocyanate-reactive compound containing at least two amine groups; optionally, d) one or more fillers; and, optionally, e) a catalyst.

DETAILED DESCRIPTION OF THE INVENTION

The invention is directed to a process for sealing a seam of a polyurethane/geotextile composite in canals and/or ditches comprising dispensing a non-sagging polyurethane composition onto a seam of a polyurethane/geotextile composite and allowing the composition to cure. The invention is further directed to a process for patching a polyurethane/geotextile composite in canals and/or ditches, comprising dispensing a non-sagging polyurethane composition onto the surface to be patched and allowing the composition to cure. The invention also relates to a process for repairing loose and/or damaged concrete in canals or ditches comprising dispensing a non-sagging polyurethane composition onto a piece or in between two or more pieces of concrete, rejoining the damaged and/or loose concrete with other pieces of concrete and allowing the composition to cure. The present invention also relates to a ditch and/or canal lined with a polyurethane/geotextile composite wherein the integrity of the canal and/or ditch has been maintained with a non-sagging polyurethane composition.

The non-sagging polyurethane composition is a reaction product of a mixture comprising: a) a liquid polyisocyanate component; b) 80%–98%, preferably 90%–98%, most preferably, 94%–97%, of a liquid isocyanate reactive component which includes: (i) one or more hydroxyl group containing compounds having from about 2 to about 6 hydroxyl groups, preferably 2 or 3 hydroxyl groups and a number average molecular weight of from at least 250 to about 8,000, preferably about 400 to about 4,000, and, optionally, (ii) up to 10% by weight, based on total weight of b), of one or more low molecular weight diols or triols having a hydroxyl equivalent weight of from about 31 to 99; c) 2–20% by weight, preferably about 2–10% by weight, most preferably about 3–6% by weight, based on total weight of b) and c) of an isocyanate-reactive compound containing at least two amine groups, preferably a diamine, polyamine, amine terminated polyether and/or mixture thereof; optionally, d) one or more fillers in an amount of up to 80% by weight, based upon the total weight of the composition, preferably in an amount of from 20 to 50% by weight; and, optionally, e) a catalyst, preferably an organometallic catalyst. It is preferred that the liquid isocyanate-reactive component b), the isocyanate-reactive compound containing at least two amino groups c), and any of the optionally included filler d) and catalyst e) be combined prior to mixing with liquid polyisocyanate component a).

As used herein, the terms "ditch" and "canal" are used interchangeably and can refer to any liquid carrying surface having a depression or grade.

Any of the known liquid polyisocyanates may be used to produce polyurethane compositions useful in the practice of the present invention. Suitable liquid organic polyisocyanates include aliphatic, cycloaliphatic, aralphatic, aromatic, and heterocyclic polyisocyanates of the type described, for example, by W. Siefken in Justus Liebigs Annalen der Chemie, 562, pages 75 to 136. Such isocyanates include those represented by the formula $Q(NCO)_n$ in which n represents a number from 2 to about 5, preferably 2 to 3, and Q represents an aliphatic hydrocarbon group containing from 2 to about 18, preferably 6 to 10, carbon atoms, a cycloaliphatic hydrocarbon group containing from 4 to about 15, preferably 5 to 10, carbon atoms, an aralphatic hydrocarbon group containing from 8 to 15, preferably 8 to 13, carbon atoms, or an aromatic hydrocarbon group containing from 6 to about 15, preferably 6 to 13, carbon atoms. Examples of suitable polyisocyanates include: ethylene diisocyanate; 1,4-tetramethylene diisocyanate; 1,6-hexamethylene diisocyanate; 1, 12-dodecane diisocyanate; cyclobutane-1,3-diisocyanate; cyclohexane-1,3- and 1,4-diisocyanate, and mixtures of these isomers; 1-isocyanato-3,3,5-trimethyl-isocyanatomethylcyclo-hexane ("isophorone diisocyanate"(See, e.g. U.S. Pat. No. 3,401,190)); 2,4- and 2,6-hexahydrotoluene diisocyanate and mixtures of these isomers; dicyclohexylmethane4,4'-diisocyanate ("hydrogenated MDI", or "HMDI"); 2,4- and 2,6-toluene diisocyanate and mixtures of these isomers ("TDI"); diphenylmethane-2,4'- and/or 4,4'-diisocyanate ("MDI"); polymethylene poly(phenylisocyanates) of the kind which may be obtained by condensing aniline with formaldehyde, followed by phosgenation ("crude MDI") (which are described, for example, in British Patents 878,430 and 848,671); norbomane diisocyanates (such as described in U.S. Pat. No. 3,492,330); m- and p-isocyanatophenyl sulfonylisocyanates (of the type described in U.S. Pat. No. 3,454,606); perchlorinated aryl polyisocyanates (of the type described, for example, in U.S. Pat. No. 3,227,138); modified polyisocyanates containing carbodiimide groups (of the type described in U.S. Pat. No. 3,152,162); modified polyisocyanates containing urethane groups (of the type described, for example, in U.S. Pat. Nos. 3,394,164 and 3,644,457); modified polyisocyanates containing allophanate groups (of the type described, for example, in British Patent 994,890); modified polyisocyanates containing isocyanurate groups (of the type described, for example, in U.S. Pat. No. 3,002,973, German Patentschriften 1,022,789, 1,222,067 and 1,027,394, and German Offenlegungsschriften 1,919,034 and 2,004,048); modified polyisocyanates containing urea groups (of the type described in German Patentschrift 1,230,778); polyisocyanates containing biuret groups (of the type described, for example, in U.S. Pat. Nos. 3,124,605 and 3,201,372, and in British Patent 889,050); polyisocyanates obtained by telomerization reactions (of the type described, for example, in U.S. Pat. No. 3,654,106); polyisocyanates containing ester groups (of the type described, for example, In British Patents 965,474 and 1,072,956, and in U.S. Pat. No. 3,567,763); reaction products of the above-mentioned isocyanates with acetals (as described in German Patentschrift 1,072,385); and polyisocyanates containing polymeric fatty acid groups (of the type described in U.S. Pat. No. 3,455,883). It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use readily available polyisocyanates, such as 2,4- and 2,6-toluene diisocyanates and their isomer mixtures ("TDI"); diphenyl methane diisocyanate ("MDI"); polymethylene poly-(phenylisocyanates) of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates"). The commercially available phosgenation products of aniline/formaldehyde condensates are the most preferred polyisocyanates to be used in the present invention.

In general, aliphatic and cycloaliphatic polyisocyanates are less suitable for the purpose of the instant invention.

Preferred liquid polyisocyanates are those having isocyanate group contents of from about 10 to 50% by weight, preferably from 15 to 35% by weight, most preferably from 30 to 33% by weight. It is generally preferred that the polyisocyanate used hav a viscosity of less than 15,000 mPa.s at 25° C.

It is also preferred that the polyisocyanate used be non-volatile at ambient temperature. The presently most preferred isocyanates are polymethylene poly(phenylisocyanates) having NCO contents of from 15 to 33.5% by weight, preferably 30 to 33% by weight and viscosities of from 20 to 3,000 mPa.s at 25° C., and liquid adducts of such isocyanates which have been made with polyols.

Suitable liquid polyisocyanate-reactive materials having from about 2 to about 6 hydroxyl groups useful in the present invention include those organic compounds having number average molecular weights of from 250 to 8,000, preferably from about 400 to about 4,000 ("high molecular weight polyol(s)" or "high molecular weight isocyanate reactive compound(s)"). These compounds include, for example, polyethers, polyesters, polythioethers, polyacetals, and polycarbonates of the type known for the production of polyurethanes. Preferred compounds include one or more polyether polyols containing from 2 to 6 isocyanate-reactive groups and having molecular weights of from 400 to 4,000.

Examples of suitable polyether polyols include polyethers prepared, for example, by the polymerization of epoxides such as ethylene oxide, propylene oxide, butylene oxide, tetrahydrofuran, styrene oxide, or epichlorohydrin, optionally in the presence of Lewis acids such as $BF_3$, or prepared by chemical addition of such epoxides, optionally added as mixtures or in sequence, to starting components containing reactive hydrogen atoms, such as water, alcohols, or amines. Examples of starting components include ethylene glycol, 1,3- or 1,2-propanediol, 1,2-, 1,3, or 1,4-butanediol, trimethylolpropane, 4,4'-dihydroxydiphenylpropane, aniline, ammonia, ethanolamine, and ethylene diamine. Sucrose polyethers of the type described, for example, in German Austegeschriften 1,176,358 and 1,064,938, may also be used according to the invention. Polyethers which contain predominantly primary hydroxyl groups (up to about 90% by weight, based on all of the hydroxyl groups in the polyether) are also suitable. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent No. 1,152,536) are also suitable, as are polybutadienes containing hydroxyl groups. Particularly preferred polyether polyols include polyoxyalkylene polyether polyols, such as polyoxypropylene diol, polyoxybutylene diol, and polytetramethylene diol, as well as polyoxypropylene polyoxyethylene diols and triols.

Further examples of suitable polyether polyols include the so-called "PHD polyols," which are prepared by reaction of an organic polyisocyanate, hydrazine, and a polyether polyol. Such polyols are disclosed in U.S. Pat. No. 3,325,421, which describes a method for producing PHD polyols by reacting a stoichiometric or substoichiometric quantity (relative to diamine) of polyisocyanate dissolved in a polyol having a molecular weight of at least 500 and a hydroxyl number of no more than 225. See also U.S. Pat. Nos. 4,042,537 and 4,089,835, the texts of which are incorporated herein by reference.

Additional examples of polyether polyols suitable for use as the liquid polyisocyanate-reactive component include the so-called "polymer polyols," which are prepared by polymerizing styrene and acrylonitrile in the presence of a polyether. See, for example, U.S. Pat. Nos. 3,383,351; 3,304,273; 3,523,093; 3,652,639; 3,823,201 and 4,390,645, the texts of which are incorporated herein by reference.

The most preferred polyethers are polyoxypropylene polyethers that do not contain ethylene oxide units.

Optionally, one or more low molecular weight (i.e., molecular weight less than 250, number average) organic diols or triols having hydroxyl equivalent weight of from about 31 to 99 can be used as a portion of the isocyanate reactive component. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, and 2,2,4-trimethylpentane-1,3-diol. Preferred diols and triols include, for example, dipropylene glycol and tripropylene glycol. Such diols and/or triols may be used in an amount of up to 10% by weight, based on total weight of isocyanate-reactive component b).

Suitable amine compounds useful as component c) in the polyurethane-forming reaction mixture include: aliphatic, cycloaliphatic and aromatic diamines and triamines having a molecular weight in the range of from about 62 to 400. Although substantially any such isocyanate-reactive diamine or triamine can be used, the preferred isocyanate-reactive amines are aliphatic, cycloaliphatic, or aromatic diamines having only primary amino groups. Particularly preferred diamines are aliphatic or cycloaliphatic diamines such as ethylene diamine, hexamethylenediamine, bis(4-aminocyclohexyl)methane, and 1-amino-3,3,5-trimethyl-5-aminomethylcyclohexane ("IPDA"). A most preferred diamine is bis(4-aminocyclohexyl)methane.

Aromatic diamines are also suitable for use as component c) in the polyurethane-forming reaction mixture of the present invention. Typical aromatic diamines have molecular weights of from about 108 to about 400 and preferably contain exclusively aromatically bound primary or secondary (preferably primary) amino groups. The aromatic diamines preferably have alkyl substituents in at least one position ortho to the amino groups. In particular, such aromatic diamines preferably have at least one $C_1$–$C_3$ alkyl substituent located ortho to one of the amino groups and two $C_1$–$C_3$ alkyl substituents located ortho to the other amino group. Diamines with an ethyl, propyl, and/or isopropyl substituent in at least one such ortho position and with methyl substituents optionally present in the other ortho position(s) are especially preferred. Mixtures of such aromatic diamines are, of course, also suitable. Suitable aromatic diamines include: 2,4-diaminomesitylene, 1,3,5-triethyl-2,4-diaminobenzene, 1,3,5-triiso-propyl-2,4-diaminobenzene, 1-methyl-3,5-diethyl-2,4-diaminomesitylene, 1-methyl-3,5-diethyl-2,6-diaminobenzene, 4,6-dimethyl-2-ethyl-1,3-diaminobenzene, 3,5,3',5'-tetraethyl-4,4-diaminodiphenylmethane, 3,5,3',5'-tetraiso-propyl-4,4'-diaminodiphenylmethane, and 3,5-diethyl-3',5'-diisopropyl4,4'-diaminodiphenylmethane. Other suitable but less preferred aromatic diamines include: 1,4-diaminobenzene, 2,4-diaminotoluene, 2,4'- or 4,4'-diaminodiphenylmethane, 3,3'-dimethyl4,4'-diaminodiphenyl-methane, 4,4'-diaminodiphenyl propane-(2,2), t-butyl toluene diamine, 1-methyl-3,5-bis-(methylthio)-2,4- or -2,6-diaminobenzene, and mixtures of such diamines. Particularly preferred aromatic diamines include: 1-methyl-3,5-diethyl-2,4-diaminobenzene, either alone or as a mixture with 1-methyl-3,5-diethyl-2,6-diaminobenzene.

Suitable but much less preferred isocyanate-reactive amines useful as component c) contain both hydroxyl and amino groups. Mixtures of such compounds with the compounds mentioned above are, of course, also suitable for use in accordance with the present invention.

Other suitable amine compounds useful in the polyurethane-forming reaction mixture include polyethers terminated with aromatic amino groups, the so-called amine terminated polyethers containing aromatically bound primary or secondary (preferably primary) amino groups. Compounds containing amino end groups can also be attached to the polyether chain through urethane, ester, or ether groups. These aromatic amine terminated polyethers can be prepared by any of several methods known in the art.

In one method for preparing aromatic amine terminated polyethers, relatively high molecular weight polyether polyols of the type suitable for use in component b) in the present invention are converted into the corresponding amine terminated polyether. Methods for making polyethers containing aromatic amino end groups are disclosed in U.S. Pat. Nos. 3,808,250, 3,975,428, and 4,016,143. Relatively high molecular weight compounds containing amino end groups may also be obtained according to U.S. Pat. No. 3,865,791 by reacting isocyanate prepolymers based on polyhydroxyl polyethers with hydroxyl-containing enamines, aldimines, or ketimines and hydrolyzing the reaction product.

Preferred aromatic amine terminated polyethers include aminopolyethers obtained by the hydrolysis of compounds containing isocyanate end groups. For example, in a process disclosed in German Offenlegungsschrift 2,948,419, polyethers containing hydroxyl groups (preferably two or three hydroxyl groups) are reacted with polyisocyanates to form isocyanate prepolymers whose isocyanate groups are then hydrolyzed in a second step to form amino groups. Particularly preferred amine terminated polyethers are prepared by hydrolyzing an aromatic isocyanate compound having an isocyanate group content of from 0.5 to 40% by weight. The most preferred of such polyethers are prepared by first reacting a polyether containing two to four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218; 4,454,730; 4,472,568; 4,501,873; 4,515,923; 4,525,534; 4,540,720; 4,578,500; and 4,565,645, all of the disclosures of which are herein incorporated by reference. Similar products are also described in U.S. Pat. Nos. 4,506,039; 4,525,590; 4,532,266; 4,532,317; 4,723,032; 4,724,252; and 4,855,504.

Other suitable amine terminated polyethers include aminophenoxy-substituted polyethers which are described, for example, in European published applications 0288825 and 0268849.

Diamines, polyamines, and amine-terminated polyethers can be used alone or combination. It is preferred to combine these amines with the other isocyanate reactive compounds prior to mixing them with the isocyanate.

Optionally, fillers can be used in the present invention. The fillers useful herein are also known. Useful fillers include calcium carbonate, barium sulfate, kieselguhr, whiting, mica, glass fibers, liquid crystal fibers, glass flakes, glass balls, aramide fibers, and carbon fibers. In addition, ground solid plastics (such as polyurethane scrap) and rubber wastes (such as from tires) of substantially any kind may also be used. Ground rubber is the presently preferred filler.

If used Catalyst e) may be used in the present invention in an amount of from about 0.0001% to about 1% by weight, preferably 0.0001% to about 0.1% by weight, based on the total weight of the liquid isocyanate reactive component. Catalysts which may be used in the present invention include, for example, various organometallic compounds, including, for example, tin(II) salts of carboxylic acids, dialkyl tin salts of carboxylic acids, dialkyl tin mercaptides, and dialkyl tin dithioesters. Of course, it is also possible to use any of the catalysts which are known to those skilled in the art of polyurethane chemistry. It is preferred to use organometallic compounds as the catalysts in the present invention.

The non-sagging patching compound of the present invention may be produced via a two-component mixing/metering machine, which ensures an accurate NCO:OH ratio using a mixhead or static mixer. Manual mixing can be achieved by kneading the reaction mixture in a flexible container such as a plastic bag for about 1–2 minutes, cutting of a corner of the bag and squeezing out the patching compound. Each of the two components can also be placed in each of the cartridges of a two-component caulking gun. The components are mixed using a static mixer in the tip of the caulking gun, and the material that is squeezed out forms a non-sagging bead.

The polyurethane composition used to seal ditches or canals in accordance with the present invention is preferably produced by reacting the isocyanate and isocyanate-reactive components b) and c) at an isocyanate index ranging from about 140 to 90, preferably from about 110 to 100. The term "Isocyanate Index" (also commonly referred to as NCO index), is defined herein as the number of equivalents of isocyanate, divided by the total number of equivalents of isocyanate-reactive hydrogen containing materials, multiplied by 100 (NCO/(OH+NH)×100).

The non-sagging polyurethane composition used in the practice of the present invention typically has a working time (i.e., period during which it may be successfully applied to seal or patch a substrate) of from about 2 to 60 minutes, preferably about 2 to 20 minutes, during which the non-sagging polyurethane composition may be applied. Once the non-sagging polyurethane composition is applied, final cure of the non-sagging polyurethane composition occurs in from about 2 to 24 hours at ambient temperature, preferably about 2 to 6 hours at ambient temperature. The cure time may, of course, be accelerated by any of the techniques known to those skilled in the art.

The non-sagging polyurethane composition used in the practice of the present invention exhibits excellent adhesion to concrete as well as to a polyurethane/geotextile composite liner. Furthermore, after the non-sagging polyurethane composition is cured, it has physical properties (i.e. elongation, tensile strength), similar to the polyurethane composition used in the preparation of the polyurethane/geotextile composite liner which is being repaired or installed.

The integrity of a canal and/or ditch is maintained with a non-sagging polyurethane composition of the present invention. In one embodiment of the present invention, the ditch and/or canal is lined with a machine such as that described in U.S. Pat. No. 5,639,331.

The invention is further illustrated but is not intended to be limited by the following examples in which all parts and percentages are by weight, unless otherwise specified.

EXAMPLES

Isocyanate A: polymethylene poly (phenylisocyanate) having an NCO content of about 31.5%, a functionality of 2.6 and a viscosity at 25° C. of 200 mPa.s.

Polyol 1: a monoethanolamine-started propylene oxide polyether polyol, having an OH number of about 350, a functionality of about 3 and a number average molecular weight of about 481.

Polyol 2: a glycerine-started propylene oxide polyether polyol, having an OH number of about 250, a functionality of about 3 and a number average molecular weight of about 670.

Polyol 3: a propylene glycol-started propylene oxide polyether polyol, having an OH number of 56, a functionality of about 2 and a molecular weight of about 2,000.

Amine 1: bis(4-aminocyclohexyl)methane

Catalyst A: dimethyltin dilaurate, commercially available as Fomrez UL-28 from Witco.

The following polyol blend was used in each of the examples:

| Polyol Blend A | 10 pbw Polyol 1 |
|---|---|
|  | 45 pbw Polyol 2 |
|  | 45 pbw Polyol 3 |

100 g Polyol Blend A, 0.003 g Catalyst A, and 3.5 g Amine 1 were mixed in a ½ gallon ZIPLOCK bag before 47.3 g of isocyanate were added. Upon addition of the isocyanate, the viscosity increased significantly and the reaction composition was kneaded in the bag for at least 2 minutes to obtain thorough mixing. A corner of the bag was then cut off and the non-sagging polyurethane composition was squeezed out as a bead. The composition remained spreadable for at least 1 hour and cured to a solid elastomeric material within 4 hours.

The non-sagging polyurethane composition was used in a variety of applications related to the installation of a polyurethane/geotextile composite in canals and/or ditches. In one application, the non-sagging polyurethane composition was spread over rips, tears, abrasions and/or the like on the polyurethane/geotextile composite using a spatula and, after curing, formed a strong watertight seal with the polyurethane/geotextile composite. In another application, the non-sagging polyurethane composition was applied as a seam sealant to the overlapping portions of a polyurethane/geotextile composite to achieve a watertight seal. In yet another application, after the polyurethane/geotextile composite was installed in a ditch and/or canal, wrinkles, air bubbles, and the like on the polyurethane/geotextile composite were cut open and the non-sagging polyurethane composition was applied to achieve a watertight seal. In still another application, the non-sagging polyurethane composition was applied to bond the polyurethane/geotextile composite around slide gate turnouts. In still another application, loose pieces of concrete were bonded together and to the surface of a ditch by applying the non-sagging polyurethane composition of the present invention.

TABLE 1

|  | Example 1 | Example 2 |
| --- | --- | --- |
| Polyol Blend A (grams) | 100 | 100 |
| Isocyanate A (grams) | 42.7 | 47.3 |
| Amine 1 (grams) | — | 3.5 |
| Index (NCO/OH × 100) | 105 | 105 |
| Catalyst A Concentration (g) | 0.003 | 0.003 |
| Viscosity (mPa.s) | 180 | Paste |

*Comparative

According to the invention, the addition of a sufficient amount of amine to the formulation, as shown in Example 2, generated a thick non-sagging paste, which was used as a non-sagging polyurethane composition in accordance with the invention.

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A process for sealing a polyurethane/geotextile composite in a canal or ditch, comprising dispensing a non-sagging polyurethane composition onto a seam of a polyurethane/geotextile composite and allowing the composition to cure, the non-sagging polyurethane composition comprising a reaction product of a mixture comprising:
    a) a liquid polyisocyanate component;
    b) 80–98% by weight, based on total weight of b) and c), of a liquid high molecular weight isocyanate reactive component comprising one or more hydroxyl group containing compounds having from about 2 to about 6 hydroxyl groups and a number average molecular weight of at least 250 and, 0–10% by weight, based on total weight of b), of a low molecular weight diol or triol having a hydroxy equivalent weight of from about 31 to 99;
    c) 2–20% by weight, based on total weight of b) and c, of an isocyanate reactive compound containing at least two amine groups;
    optionally,
    d) one or more fillers in an amount of up to 80% by weight, based upon the total weight of the non-sagging polyurethane composition; and
    optionally,
    e) a catalyst.

2. The process of claim 1, wherein the high molecular weight hydroxyl group containing compound of the liquid isocyanate reactive component b) has a number average molecular weight of from about 400 to about 4,000.

3. The process of claim 1 wherein isocyanate-reactive compound c) is selected from the group consisting of diamines, polyamines, amine terminated polyethers or combinations thereof.

4. The process of claim 1, wherein an organo-metalic catalyst is used as catalyst e).

5. The process of claim 1, wherein the isocyanate reactive compound c) has at least two aromatic amine groups.

6. The process of claim 1, wherein the isocyanate reactive compound c) has at least two alicyclic amine groups.

7. The process of claim 1, wherein the liquid isocyanate component a) is polymethylene poly (phenylisocyanate).

8. The process of claim 1, wherein the high molecular weight hydroxyl group containing compound of the liquid isocyanate reactive component b) is a polyether.

9. The process of claim 8, wherein the polyether does not have any ethylene oxide units.

10. The process of claim 1, wherein 0% filler d) is included in the non-sagging polyurethane-forming mixtures.

11. The process of claim 1, wherein no catalyst e) is included in the non-sagging polyurethane-forming mixture.

12. The process of claim 1, wherein 0% low molecular weight diol or triol is included in the liquid isocyanate reactive component b).

13. The process of claim 1, wherein the amounts of polyisocyanate and polyisocyanate reactive components used to produce the non-sagging polyurethane composition are such that an isocyanate index of from 140 to 90 is achieved.

14. The process of claim 1, wherein the amounts of polyisocyanate and polyisocyanate reactive components used to produce the non-sagging polyurethane are such that an isocyanate index range of from 110 to 100 is achieved.

15. The process of claim 1, wherein the liquid isocyanate reactive component b) and the isocyanate reactive compound c) are used in a ratio of 90:10 to 98:2.

16. A process for patching a polyurethane/geotextile composite in a canal or a ditch comprising dispensing a non-sagging polyurethane composition onto a tear, rip and/or other abrasion on a polyurethane/geotextile composite and allowing the composition to cure, the non-sagging polyurethane composition comprising a reaction product of a mixture comprising:
    a) a liquid polyisocyanate component;
    b) 80–98% by weight, based on total weight of b) and c), of a liquid high molecular weight isocyanate reactive component comprising one or more hydroxyl group containing compounds having from about 2 to about 6 hydroxyl groups and a number average molecular weight of at least 250 and, 0–10% by weight based on total weight of b), of a low molecular weight diol or triol having a hydroxy equivalent weight of from about 31 to 99;
    c) 2–20% by weight, based on total weight of b) and c, of an isocyanate-reactive compound containing at least two amine groups;
    optionally,
    d) one or more fillers in an amount of up to 80% by weight based upon the total weight of the non-sagging polyurethane composition; and
    optionally,
    e) a catalyst.

17. The process of claim 16, wherein the high molecular weight hydroxyl group containing compound of the liquid isocyanate reactive component b) has a number average molecular weight of from about 400 to about 4,000.

18. The process of claim 16 wherein compound c) is selected from the group consisting of diamines, polyamines, amine terminated polyethers or combinations thereof.

19. The process of claim 16, wherein an organo-metallic catalyst is used as catalyst e).

20. The process of claim 16, wherein the isocyanate reactive compound c) has at least two aromatic amine groups.

21. The process of claim 16, wherein the isocyanate reactive compound c) has at least two alicyclic amine groups.

22. The process of claim 16, wherein the liquid isocyanate component a) is polymethylene poly(phenylisocyanate).

23. The process of claim 16, wherein the high molecular weight hydroxyl group containing compound of the liquid isocyanate reactive component b) is a polyether.

24. The process of claim 23, wherein the polyether has no ethylene oxide units.

25. The process of claim 16, wherein 0% filler d) is included in the non-sagging polyurethane-forming mixture.

26. The process of claim 16, wherein no catalyst e) is included in the non-sagging polyurethane-forming mixture.

27. The process of claim 16, wherein 0% low molecular weight diol or triol is included in the liquid isocyanate reactive component b).

28. The process of claim 16, wherein the amount of polyisocyanate and polyisocyanate reactive components used to produce the non-sagging polyurethane composition is such that an isocyanate index of from 140 to 90 is achieved.

29. The process of claim 16, wherein the amount of polyisocyanate and polyisocyanate reactive components used to produce the non-sagging polyurethane composition is such that an isocyanate index range of from 110 to 100 is achieved.

30. The process of claim 16, wherein the liquid isocyanate reactive component b) and the isocyanate reactive compound c) are used in a ratio of 90:10 to 98:2.

31. A process for repairing loose and/or damaged concrete in a canal or a ditch comprising dispensing a non-sagging polyurethane composition onto a piece of or in between two or more pieces of concrete, rejoining the damaged or loose concrete with other pieces of concrete and/or a surface and allowing the composition to cure, the non-sagging polyurethane composition comprising a reaction product of a mixture comprising:
   a) a liquid polyisocyanate component;
   b) 80–98% by weight, based on total weight of b) and c) of a liquid high molecular weight isocyanate reactive component comprising one or more hydroxyl group containing compounds having from about 2 to about 6 hydroxyl groups and a number average molecular weight of at least 250 and, 0–10% by weight, based on total weight of b), of a low molecular weight diol or triol having a hydroxy equivalent weight of from about 31 to 99;
   c) 2–20% by weight, based on total weight of b) and c) of an isocyanate reactive compound containing at least two amine groups;
   optionally
   d) one or more fillers in an amount of up to 80% by weight, based upon the total weight of the non-sagging polyurethane composition; and
   optionally
   e) a catalyst.

32. The process of claim 31, wherein the high molecular weight hydroxyl group containing compound of the liquid isocyanate reactive component b) has a number average molecular weight of from about 400 to about 4,000.

33. The process of claim 31 wherein compound c) is selected from the group consisting of diamines, polyamines, amine terminated polyethers or combinations thereof.

34. The process of claim 31, wherein an organo-metallic catalyst is used as catalyst e).

35. The process of claim 31, wherein the isocyanate reactive compound c) has at least two aromatic amine groups.

36. The process of claim 31, wherein the isocyanate reactive compound c) has at least two alicyclic amine groups.

37. The process of claim 31, wherein the liquid isocyanate component a) is polymethylene poly(phenylisocyanate).

38. The process of claim 31, wherein the high molecular weight hydroxyl group containing compound of the liquid isocyanate reactive component b) is a polyether.

39. The process of claim 31, wherein the polyether has no ethylene oxide units.

40. The process of claim 31, wherein 0% filler d) is included in the non-sagging polyurethane-forming mixture.

41. The process of claim 31, wherein no catalyst e) is included in the non-sagging polyurethane-forming mixture.

42. The process of claim 31, wherein 0% low molecular weight diol or triol is included in the liquid isocyanate reactive component b).

43. The process of claim 31, wherein the amount of polyisocyanate and polyisocyanate reactive components used to produce the non-sagging polyurethane composition is such that an isocyanate index of from 140 to 90 is achieved.

44. The process of claim 31, wherein the amount of polyisocyanate and polyisocyanate reactive components used to produce the non-sagging polyurethane composition is such that an isocyanate index of from 110 to 100 is achieved.

45. The process of claim 31, wherein the liquid isocyanate reactive component b) and the isocyanate reactive compound c) are used in a ratio of 90:10 to 98:2.

46. A ditch or canal lined with a polyurethane/geotextile composite wherein the integrity of the canal and/or ditch has been maintained with a non-sagging polyurethane composition, the non-sagging polyurethane composition comprising a reaction product of a mixture comprising:
   a) a liquid polyisocyanate component;
   b) 80–98% by weight, based on total weight of b) and c), of a liquid high molecular weight isocyanate-reactive component comprising one or more hydroxyl group containing compounds having from about 2 to about 6 hydroxyl groups and a number average molecular weight of at least 250 and, 0–10% by weight, based on total weight of b) of a low molecular weight diol or triol having a hydroxy equivalent weight of from about 31 to 99;
   c) 2–20% by weight, based on total weight of b) and c) of an isocyanate reactive compound containing at least two amine groups;
   optionally,
   d) one or more fillers in an amount of up to 80% by weight based upon the total weight of the non-sagging polyurethane composition; and
   optionally,
   e) a catalyst.

47. The ditch or canal of claim 46 wherein compound c) is selected from the group consisting of diamines, polyamines, amine terminated polyethers and combinations thereof.

* * * * *